United States Patent [19]

Wetzel et al.

[11] 4,166,408
[45] Sep. 4, 1979

[54] AMMUNITION HANDLING SYSTEM

[75] Inventors: Lewis K. Wetzel, S. Burlington; Edward A. Proulx, Burlington, both of Vt.

[73] Assignee: General Electric Company, Burlington, Vt.

[21] Appl. No.: 833,324

[22] Filed: Sep. 14, 1977

[51] Int. Cl.² .............................................. F41D 9/06
[52] U.S. Cl. ...................................... 89/33 D; 89/34; 89/37.5 C; 198/778
[58] Field of Search ......... 89/33 D, 34, 35 R, 37.5 C; 198/328, 405, 778

[56] References Cited

U.S. PATENT DOCUMENTS

| 701,459 | 6/1902 | Aston | 198/328 |
| 782,009 | 2/1905 | Dodge | 198/778 |
| 3,429,221 | 2/1969 | Kirkpatrick | 89/33 BB |
| 3,670,863 | 6/1972 | Meier et al. | 89/33 MC |
| 3,696,704 | 10/1972 | Backus et al. | 89/34 |

FOREIGN PATENT DOCUMENTS

843971 8/1960 United Kingdom ................ 89/37.5 C

Primary Examiner—Stephen C. Bentley
Attorney, Agent, or Firm—Bailin L. Kuch

[57] ABSTRACT

A weapon system is provided in a pod envelope having an endless conveyor, formed of a plurality of conveyor elements, and disposed in a two layer, multiturn, helical spiral, with a turnaround and transition between layers at each end, and a gun disposed within the spiral of the conveyor.

18 Claims, 11 Drawing Figures

AMMUNITION HANDLING SYSTEM

BACKGROUND OF THE INVENTION

1. Field of the Invention

This invention relates to a system for storing and for feeding articles at a high velocity, and is embodied in a system for storing and feeding linkless rounds of ammunition to a high rate of fire machine gun, as in a pod externally mounted to an aircraft.

2. Prior Art

U.S. Pat. No. 2,364,510 issued Dec. 5, 1944 to E. M. Bertram et al provides an early showing of a machine gun having its own ammunition magazine mounted in a fairing which is externally mounted to an aircraft. Ammunition handling systems for linkless ammunition for high rate of fire machine guns are well known. Examples can be found in U.S. Pat. No. 2,935,914 issued to B. Darsie et al on May 10, 1960; U.S. Pat. No. 2,993,415 issued to E. W. Panicci et al on July 25, 1961; and U.S. Pat. No. 3,696,704 issued to L. F. Backus et al on Oct. 10, 1972. These systems include an outer stationary drum having longitudinal partitions therein, and an inner, rotating, helical partition. Rounds are arranged radially about the central longitudinal axis and have their projectiles disposed between adjacent layers of the helical partition. Rotation of the helical partition advances the rounds longitudinally along the drum, which rounds are picked up by a scoop disc assembly having traveling sprockets. This system is exemplified in the SUU-16/A, SUU 23/A the SUU-11/B and the GPU-2/A gun pods. In the GPU-2/A the outer drum contains a fixed helix and the ammunition is advanced along the helix by a central rotor having longitudinal partitions thereon. In these gun pods the drum is aft of the gun and the rounds are perpendicular to the longitudinal axis of the gun. The volume of the pod is thus rather large, requiring in length at least the sum of the lengths of the gun and the drum, plus an intercoupling conveyor mechanism, and in diameter at least twice the length of the rounds plus the diameter of the empty core of the helix. The intercoupling conveyor mechanism, such as a feed chute, must accommodate the relative movement between the longitudinally stationary drum and the recoiling gun. U.S. Pat. No. 3,800,658 issued Apr. 2, 1974 to D. P. Tassie et al shows an aft drum wherein the rounds are stored at a 60° angle to the longitudinal axis to reduce the diameter of the drum. The intercoupling feed mechanism comprises a resilient helical guide wrapped around a longitudinally extending sprocket, one end of the guide being fixed to the drum support and the other end being fixed to the gun support. Fired cases are discharged from the pod.

SUMMARY OF THE INVENTION

It is an object of this invention to provide an ammunition handling system for a gun which will provide the smallest possible total volume when both are mounted in a pod.

Another object is to provide such a system wherein each round is under positive control at all times during storage and feeding.

Yet another object is to provide such a system requiring a minimum of power to advance the rounds to the gun.

Still another object is to provide such a system providing a minimum of shift of the center of gravity of the system as the ammunition is expended.

A feature of this invention is an endless conveyor, formed of a plurality of conveyor elements, and disposed in a two layer, multiturn, helical spiral, with a turnaround and transition between layers at each end.

BRIEF DESCRIPTION OF THE DRAWING

These and other objects, features and advantages of this invention will be apparent from the following specification thereof taken in conjunction with the accompanying drawing in which.

THE PREFERRED EMBODIMENT

Figure 1:
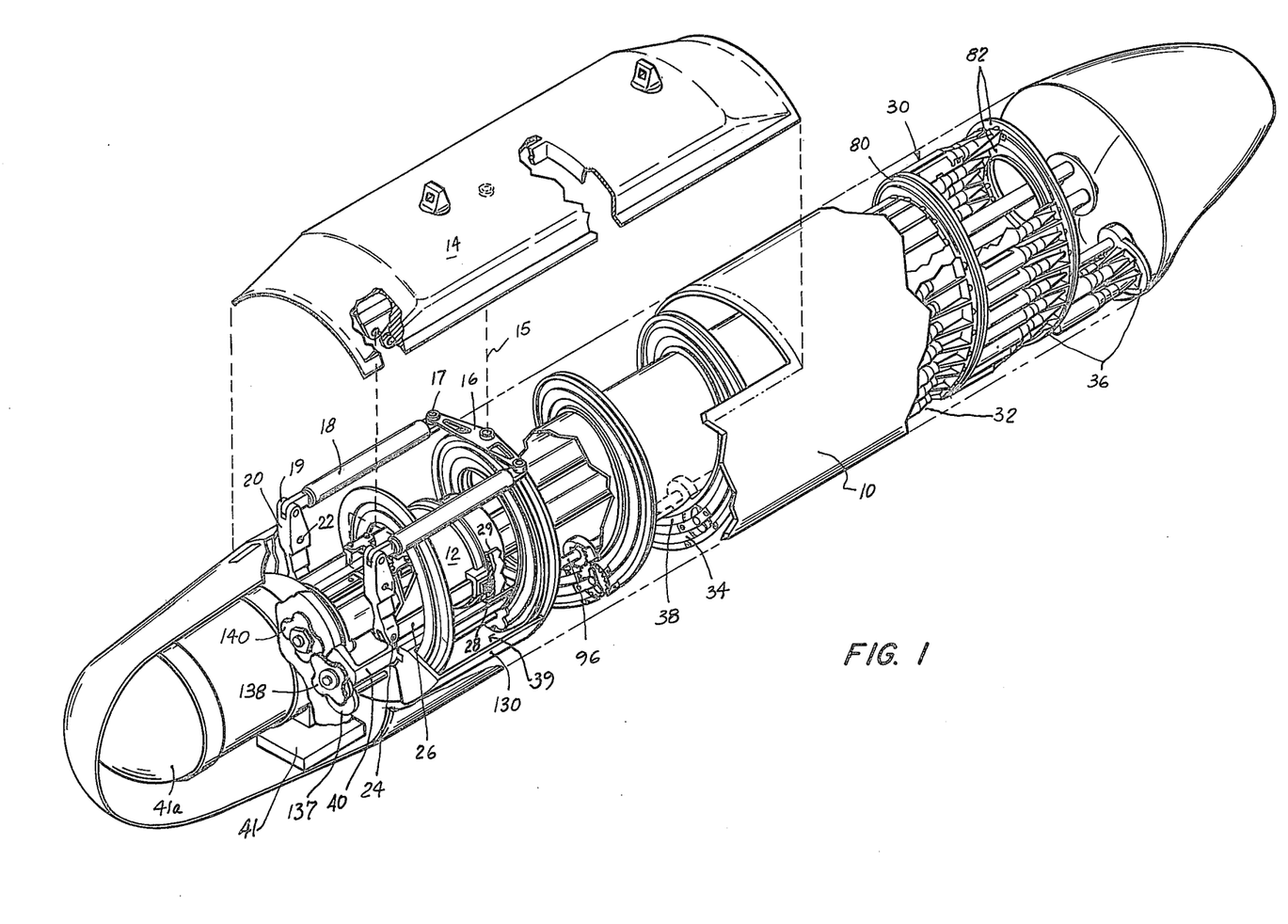
FIG. 1 is a perspective view, partially cut away, of a pod mounted gun and ammunition handling system embodying this invention.

The embodiment shown in FIG. 1 comprises a pod envelope 10 enclosing and supporting a high rate of fire gun 12, for example, of the type shown in U.S. Pat. No. 3,611,871 issued to R. G. Kirkpatrick et al, but having four barrels and firing 30 mm ammunition, and an ammunition handling system for storing and supplying rounds of ammunition to the gun and for receiving fired cases from the gun.

The pod includes a strongback 14 which is mounted to the aircraft, and to which at 15 is pivotally mounted a yoke 16, to which are pivotally mounted at 17 the forward ends of two recoil adapters 18, whose aft ends are pivotally mounted at 19 to the upper ends of two rocker arms 20. The arms are mediately pivotally mounted at 22 to the strongback, and their lower ends are pivotally mounted at 24 to bars 26 pivotally mounted to the housing of the gun 12 at 28. A pair of slide blocks 29 pivotally mounted to the gun housing at 28 support the gun in tracks which permit longitudinal travel of the gun with respect to the pod due to recoil force.

The ammunition handling system 30 comprises a single, endless conveyor, formed of a plurality of conveyor elements 32 and disposed in a two layer, multiturn, helical spiral, with a turnaround and transition between layers at each end. The conveyor elements normally move forwardly in the outer layer 34, move centripetally in the forward turnaround 36, move aftwardly in the inner layer 38, and move centrifugally in the aft turnaround 39. The aft turnaround is incorporated into a stripper-feeder 40 which is fixed to the gun housing. A pneumatic motor 41 supplied by an air bottle 41a drives the gun.

Figures 5, 6, 7:
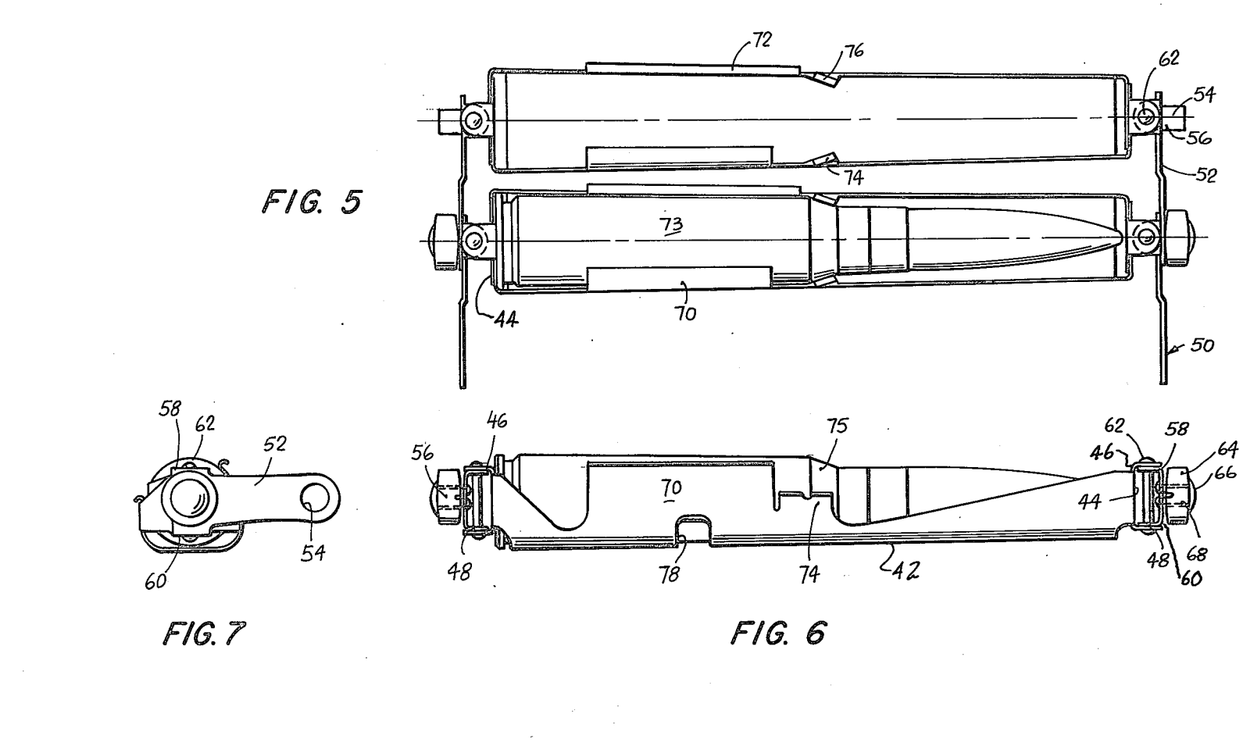
FIG. 5 is a top view of two of the conveyor elements forming the endless conveyor of the system of FIG. 1.
FIG. 6 is a side view of a conveyor element of FIG. 5.
FIG. 7 is an end view of the conveyor element of FIG. 6.

As shown in FIG. 6, each conveyor element comprises a cradle 42, longitudinally extending and U-shaped in cross-section. Each end of the cradle is closed by an end piece 44 having an upper tab 46 and a lower tab 48. A link 50 has an arm portion 52 with a hole 54 at one end and a hollow stud 56 riveted thereon at the other end. This other end also has an upper tab 58 and a lower tab 60. The two sets of tabs 46;48 and 58;60 are pivotally joined by two headed rivets 62. A roller 64 is journaled to each link by a headed snap pin 66 passing through the bore 68 of the roller and the hole of the stud 56. The head of the snap pin 66 and the inner and outer peripheral surfaces of the roller provide antifriction means for the movement of the element, which is articulated at the pin 62. The hole 54 of each link receives the stud 56 of the next adjacent conveyor element to join each conveyor element, seriatim, into the endless conveyor. The articulation provided by the pin 62 at each end of each conveyor element permits the conveyor element to remain parallel to the longitudinal axis of the gun while the rollers 64 and the links 50 follow a helical path about that longitudinal axis. The articulation provided by the stud 56 at each end of each element permits the chain of elements to wrap around the several diameters. Each conveyor element includes two side spring fingers 70 and 72 encircling the cylindrical body 73 of the cartridge case, the finger 70 being peripherally longer than the finger 72; two spring fingers 74 and 76 encircling the cone 75 of the neck of the case; and a transverse cut-out 78.

Figures 2, 4:
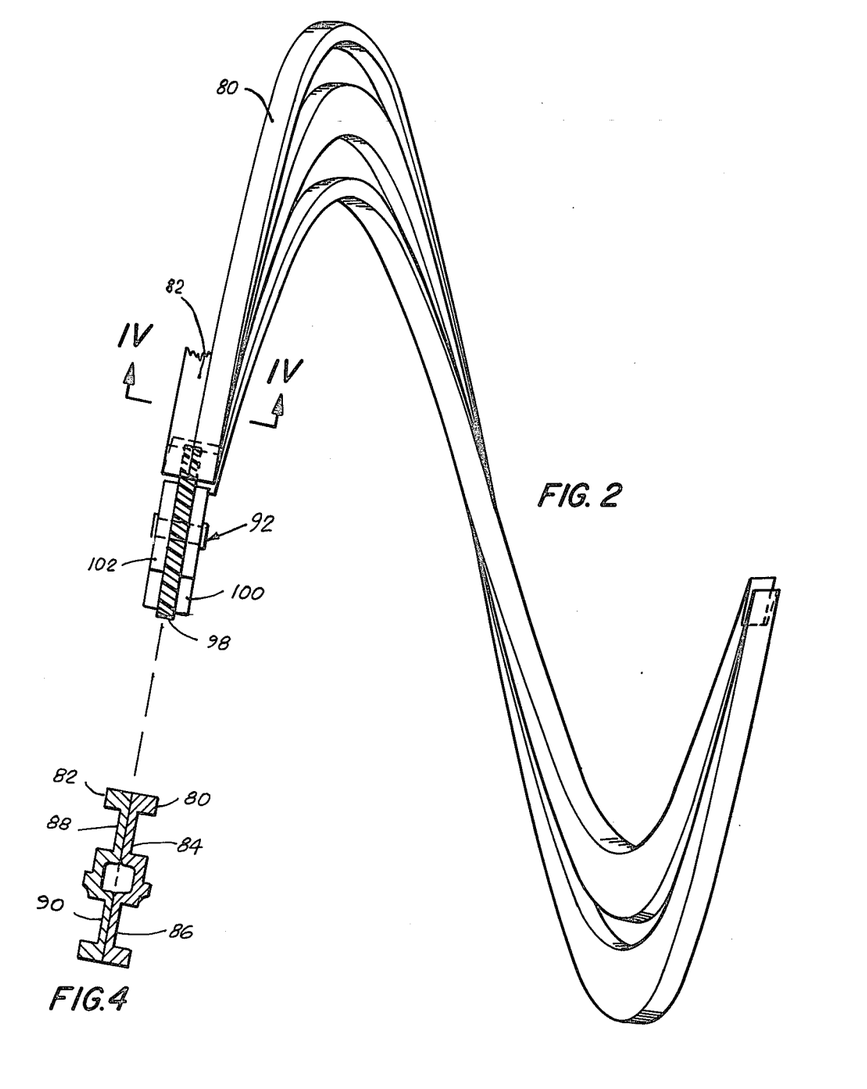
FIG. 2 is a side view in elevation of one turn of a helical support for the conveyor elements, together with a drive gear and sprockets.
FIG 4 is a typical view in cross-section of the support of FIG. 2.
Figure 3:
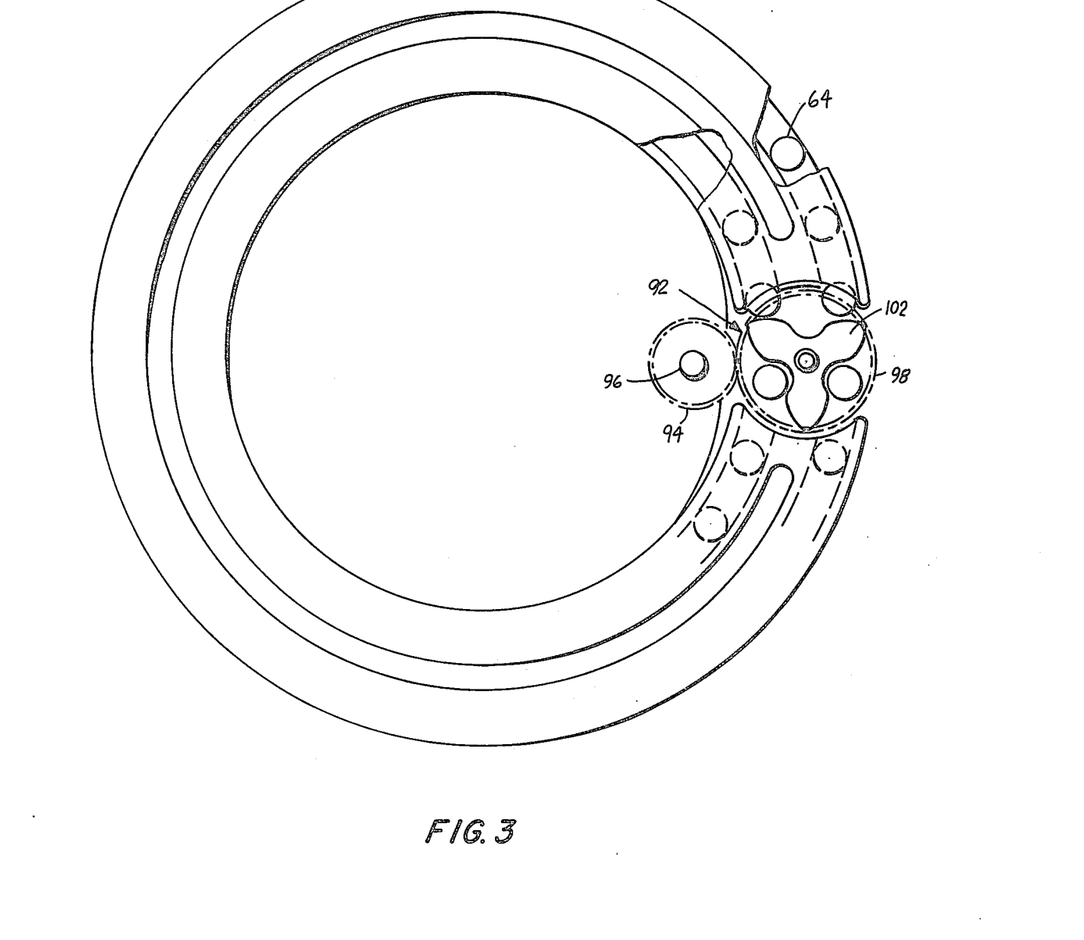
FIG. 3 is an end view in elevation of the support of FIG. 2.

As shown in FIGS. 2, 3, and 4, the conveyor elements are supported between and along a pair of helical guides 80 and 82. Each guide 80 has a radially outer track or slot 84 and a radially inner track or slot 86; and each guide 82 has a radially outer track or slot 88 and a radially inner track or slot 90. Each track is made up of sections which are substantially 360° in revolution. A sprocket assembly 92 is mounted at the junction of each section so that there is a sprocket assembly at each junction and successive junctions are substantially 360° apart. Each sprocket assembly is adjacent a respective spur-gear 94 fixed on a longitudinally extending drive shaft 96 which is mounted radially inwardly of the helical guides. Each sprocket assembly includes a helical gear 98, which is meshed with the respective spur gear 94, and two sprockets 100 and 102 fixed to the gear 98. The sprocket 100 has three teeth which project into the tracks or slots 84 and 86 of the helical guide 80, and the sprocket 102 has three teeth which project into the tracks or slots 88 and 90 of the helical guide 82. These teeth engage the rollers 64 of the conveyor elements and drive the endless conveyor. The shaft 96 is driven through a gear train, not shown, by a gear on the rotor of the gun.

A turnaround or transition between the inner and outer runs or layers of the endless conveyor are provided at each end of the conveyor.

Figure 8:
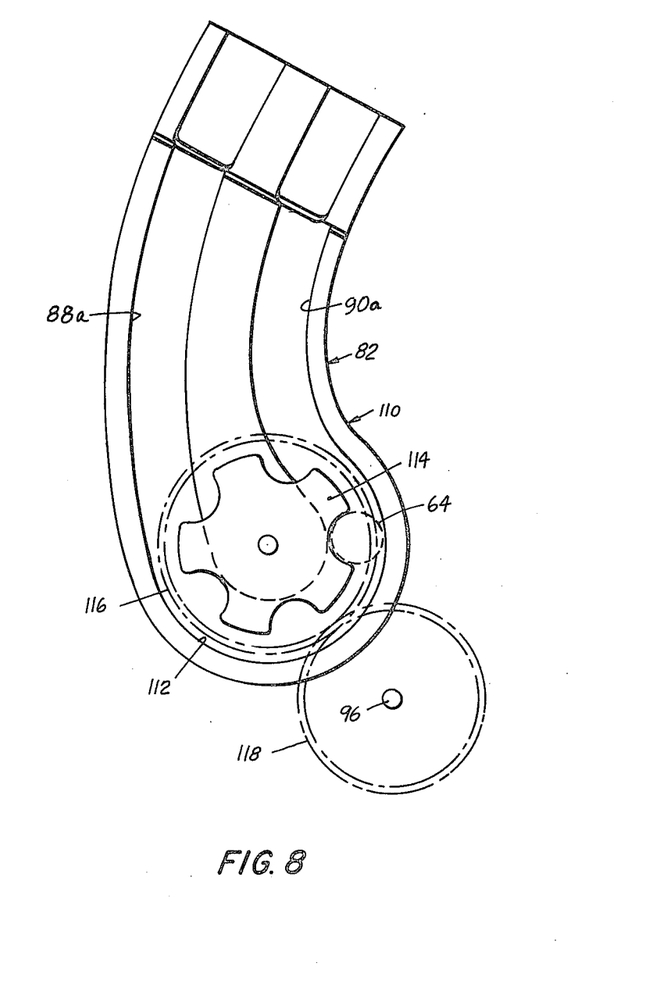
FIG. 8 is an end view of the forward transition of the helical support.
Figure 9:
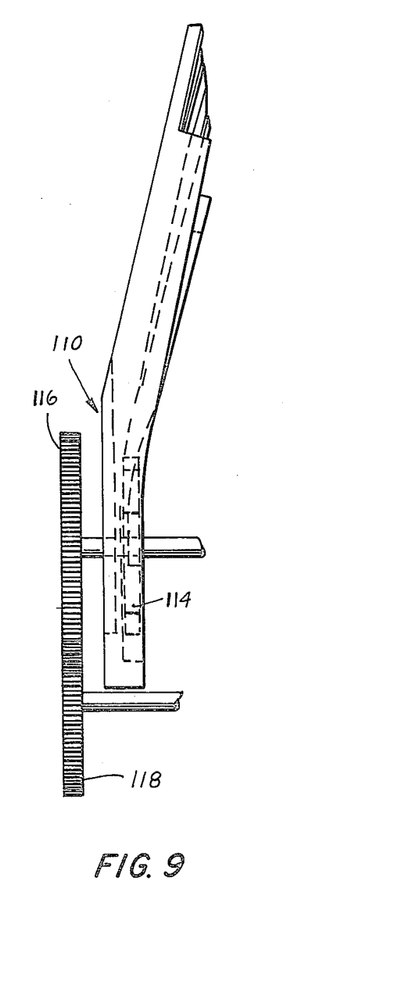
FIG. 9 is a side view of the forward transition of FIG. 8.

As shown in FIGS. 1, 8, and 9, the pair of helical guides of the forward transistion 36 have a radially-outer track or slot 88a (84a) and a radially-inner track or slot 90a (86a) with a semicircular transitional track or slot 112. A pair of driving five tooth sprockets 114 are respectively spaced from the semicircular transitional tracks so as to push the rollers 64 in and to pull the rollers out therefrom. The sprockets are fixed respectively to a gear 116 and driven by a spur gear 118 on the shaft 96.

Figure 10:
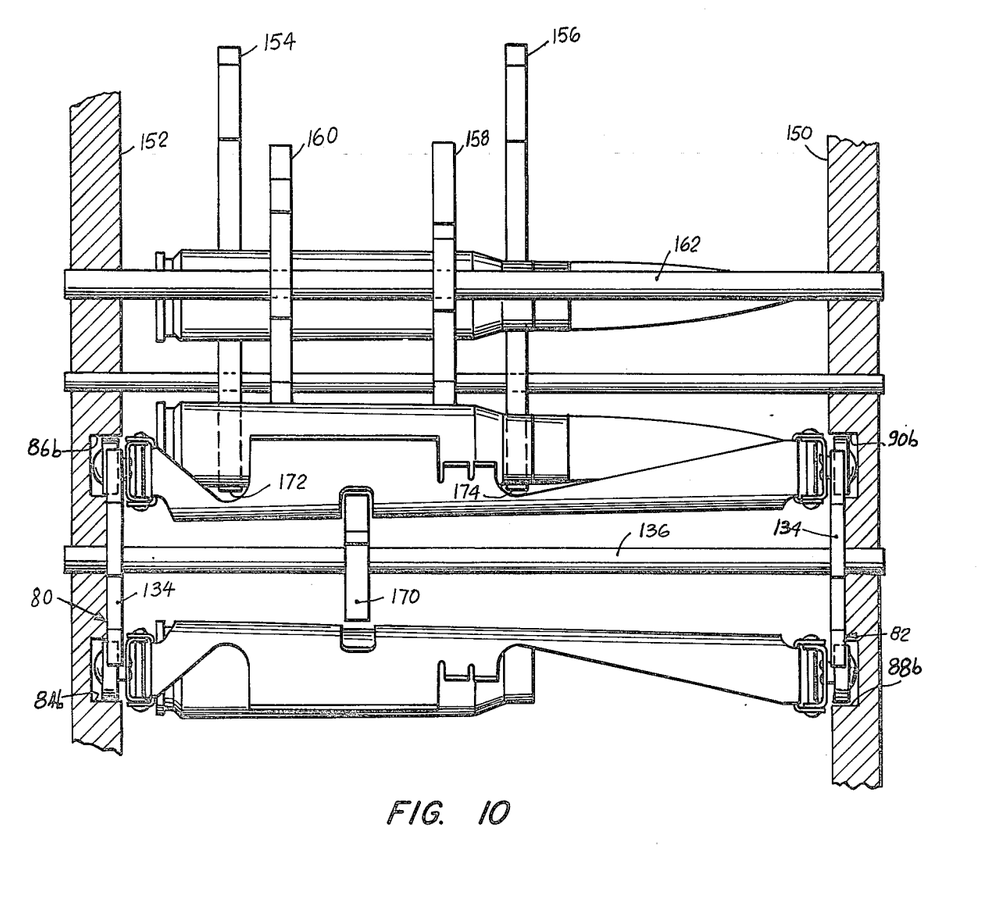
FIG. 10 is a side view of the aft transition of the helical support including the stripper-feeder for the gun.
Figure 11:
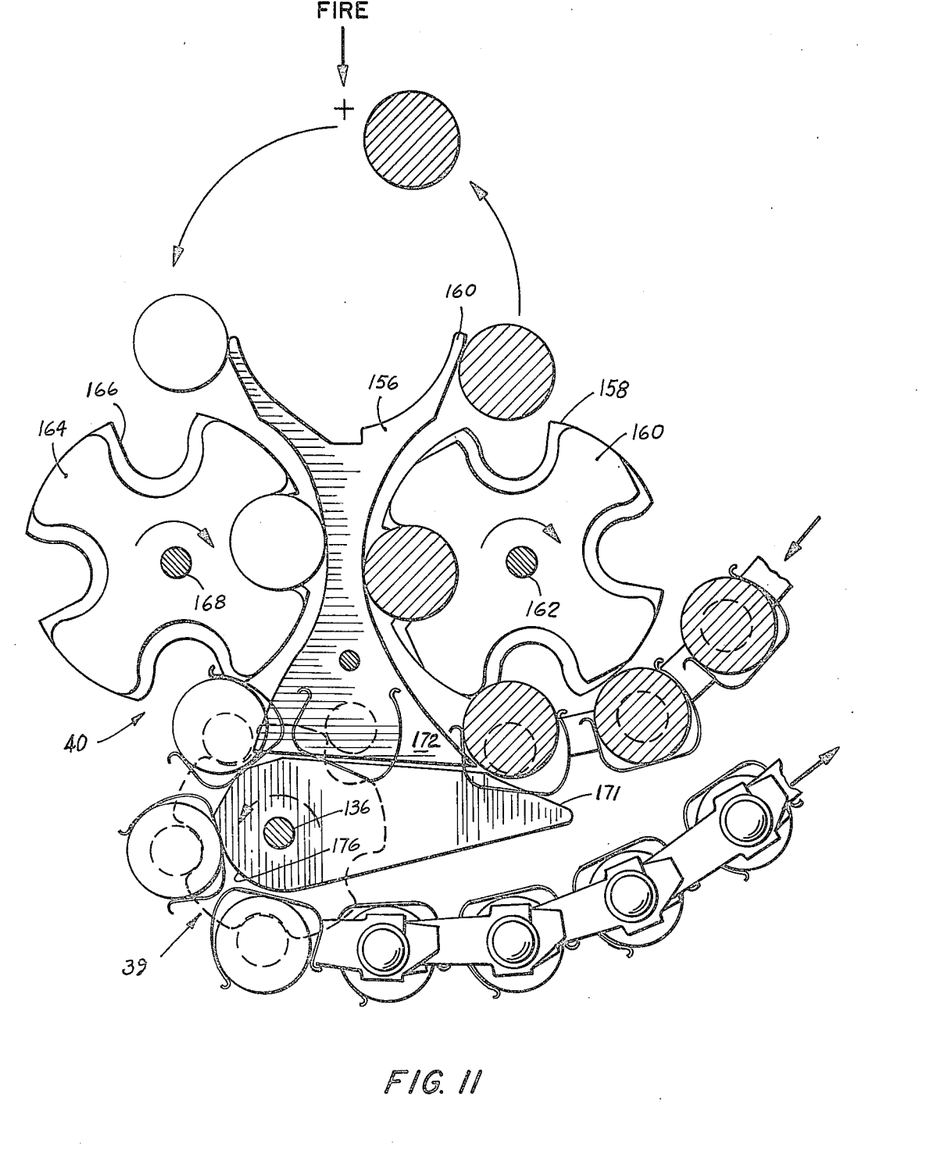
FIG. 11 is an end view of the aft transition of the helical support including the stripper-feeder for the gun.

The pair of helical guides of the aft transition 39 are incorporated into a stripper-feeder 40, as shown in FIGS. 1, 10 and 11. The helical guides 80 and 82 are joined to a U-shaped structure 130 whose side walls provide a continuation of the tracks, i.e. a radially-outer track or slot 88b, 84b and a radially-inner track or slot 90b, 86b with a semicircular transitional track or slot. A pair of driving five tooth sprockets 134 are respectively spaced from the semicircular transitional tracks so as to pull rollers 64 in and to push the rollers out therefrom. The sprockets are respectively fixed to a shaft 136. The shaft 136 is fixed to a gear 137, which is driven by a gear train, not shown, by the gear on the rotor of the gun. The feeder-stripper has two side walls 150, 152 to and between which the aft transition 39 is fixed, and which in turn are fixed to the housing of the gun. Two guide bars 154, 156 project through the housing and are fixed between the side walls 150, 152. A pair of feeding sprockets 158, 160 are fixed to a shaft 162 which is driven by a pair of fourth order elliptical gears 138 and 140 to provide sinusoidal motion. A pair of unloading sprockets 164, 166 are fixed to a shaft 168 which is driven by a pair of fourth order elliptical gears, not shown, to provide sinusoidal motion. A pre-stripper 170 is fixed between the side motion. A pre-stripper 170 is fixed between the side walls and its ramp 171 is adapted to enter the transverse cut-out 78 in each conveyor element in the inner layer 38 as it enters the feeder-stripper. The pre-stripper provides an initial dislodgement of the cartridge case from the conveyor element to permit the points 172, 174 of the guides to enter between the cartridge case and the conveyor element, to complete the removal of the cartridge case (with its projectile) from the conveyor element. The stripped round has been engaged by the feeding sprockets and is carried up the guides into the gun housing and handed off to the gun bolts. Fired cases are handed off from the gun bolts to the unloading sprockets and reseated in the conveyor elements. Ammunition and cases may be loaded and unloaded from the endless conveyor at any convenient station therein, e.g. adjacent the heel 176 of the pre-stripper.

The aft-most turn of the helix is thus coupled and free to flex between the stripper-feeder which recoils with the gun, and the forward remainder of the helix which is stationary with the gun pod, and accommodates the helical storage system to the recoiling gun.

What is claimed is:

1. An article handling system comprising:
   an endless conveyor, including a plurality of article carriers disposed in a two layer, multiturn, helical spiral about a longitudinal axis, with a turnaround and transition between layers at each end; and
   a pair of spaced apart multiturn helical spiral guides, supporting each of said article carriers therebetween; wherein:
   each of said article carriers includes
   an elongated article receiving member having a longitudinal axis,
   a pair of spaced apart support members, one adjacent each end of said elongated member, engaging a respective one of said guides, the longitudinal axis of each elongated member being parallel to said longitudinal axis of said conveyor.

2. A system according to claim 1 wherein:
each of said spiral guides has a radially outer track and a radially inner track, each track adapted to interengage with a support member of a respective article carrier.

3. A system according to claim 2 wherein:
each of said support members includes a roller which is journaled on a first shaft for rotation about a first axis, and which first shaft is pivotally coupled to said elongated member for movement about a second axis which is perpendicular to said first axis.

4. An article handling system comprising:
an endless conveyor, including a plurality of article carriers disposed in a two layer, multiturn, helical spiral about a longitudinal axis, with a turnaround and transition between layers at each end; wherein
at least one turn of said conveyor is resiliently mounted for longitudinal displacement with respect to the remaining turns of said conveyor.

5. A weapon system comprising:
an endless conveyor, including a plurality of ammunition carriers disposed in a two layer, multiturn, helical spiral about a longitudinal axis with a turnaround and transition between layers at each end;
a pair of spaced apart multiturn helical spiral guides supporting each of said ammunition carriers therebetween; wherein
each of said ammunition carriers includes
a member, for receiving a round of ammunition, having a longitudinal axis,
a pair of spaced apart support members, one adjacent each end of said elongated member, engaging a respective one of said guides,
the longitudinal axis of each round of ammunition receiving member being parallel to said longitudinal axis of said conveyor.

6. A system according to claim 5 wherein:
each of said spiral guides has a radially outer track and a radially inner track, each track adapted to interengage with a support member of a respective ammunition carrier.

7. A system according to claim 6 wherein:
each of said support members includes a roller which is journaled on a first shaft for rotation about a first axis, and which first shaft is pivotally coupled to said round of ammunition receiving member for movement about a second axis which is perpendicular to said first axis.

8. A weapon system comprising:
an endless conveyor, including a plurality of ammunition carriers disposed in a two layer, multiturn, helical spiral about a longitudinal axis with a turnaround and transition between layers at each end;
a gun, disposed within said spiral of said conveyor, having a longitudinal axis substantially coincident with said conveyor longitudinal axis;
a feeder fixed to said gun;
a pod envelope disposed around said spiral of said conveyor;
said gun being mounted to, and for recoil with respect to, said pod envelope;
one end of said spiral of said conveyor being fixed to said feeder;
the other end of said spiral of said conveyor being fixed to said pod envelope.

9. A system according to claim 8 wherein:
at least one turn of said spiral of said conveyor is resiliently mounted for longitudinal displacement with respect to the remaining turns of said spiral, whereby to accommodate said conveyor to the longitudinal movement during recoil of said feeder with respect to said pod envelope.

10. A weapon system comprising:
an endless conveyor, including a plurality of ammunition carriers disposed in a two layer, multiturn, helical spiral about a longitudinal axis with a turnaround and transition between layers at each end;
a gun, disposed within said spiral of said conveyor, having a longitudinal axis substantially coincident with said conveyor longitudinal axis;
a feeder fixed to said gun;
a pod envelope disposed around said spiral of said conveyor;
said gun being mounted to, and for recoil with respect to, said pod envelope;
the aft end of said spiral of said conveyor being fixed to said feeder;
the forward end of said spiral of said conveyor being fixed to said pod envelope;
at least the aft-most turn of said spiral of said conveyor being resiliently mounted for longitudinal displacement with respect to the remaining turns of said spiral, whereby to accommodate said conveyor to the longitudinal movement during recoil of said feeder with respect to said pod envelope.

11. A weapon system comprising:
an endless conveyor, including a plurality of ammunition carriers disposed in a two layer, multiturn, helical spiral about a longitudinal axis with a turnaround and transition between layers at each end;
a pair of spaced apart multiturn helical spiral guides, supporting each of said ammunition carriers therebetween; wherein
each of said ammunition carriers includes
a member, for receiving a round of ammunition, having a longitudinal axis,
a pair of spaced apart support members, one adjacent each end of said elongated member, engaging a respective one of said guides;
the longitudinal axis of each round of ammunition receiving member being parallel to said longitudinal axis of said conveyor; and
a gun having a feeder;
one end of said spiral of said conveyor being fixed to said feeder;
each round of ammunition receiving member of said ammunition carrier having a transverse slot therein;
said feeder having
a first means for entering each slot to initially dislodge a round of ammunition within its respective carrier,
a second means for subsequently passing between a dislodged round of ammunition and its respective carrier and for stripping such round from said carrier, and
third means for passing a stripped round into the gun.

12. A system according to claim 11 further including:
fourth means for passing a fired cartridge case into an ammunition carrier of said conveyor.

13. An article handling system comprising:

an endless conveyor, including a plurality of article carriers disposed in a two layer, multiturn, helical spiral about a longitudinal axis with a turnaround and transition between said layers at each end of said conveyor, said multiturn spiral including a first end turn, a second end turn and a plurality of intermediate turns;

a plurality of sprockets, each of said sprockets disposed in a respective one of said plurality of intermediate turns and concurrently engaged with a respective article carrier in one of said layers of said intermediate turn of said conveyor and with a respective article carrier in the other of said layers of said intermediate turn of said conveyor.

14. A system according to claim 13 further including:

drive means coupled to each of said plurality of sprockets for driving said sprockets in synchronism.

15. A weapon system comprising:

an endless conveyor, including a plurality of ammuniton conveyors disposed in a two layer, multiturn, helical spiral about a longitudinal axis with a turnaround and transition between said layers at each end of said conveyor, said multiturn spiral including a first end turn, a second end turn and a plurality of intermediate turns;

a plurality of sprockets, each of said sprockets disposed in a respective one of said plurality of intermediate turns and concurrently engaged with a respective ammunition carrier in one of said layers of said intermediate turn of said conveyor and with a respective ammunition carrier in the other of said layers of said intermediate turn of said conveyor.

16. A system according to claim 15 further including:

a pair of spaced apart multiturn helical spiral guides, supporting each of said ammunition carriers therebetween.

17. A system according to claim 15 further including:

drive means coupled to each of said plurality of sprockets for driving said sprockets in synchronism.

18. A system according to claim 15 further including:

a gun, disposed within said spiral of said conveyor, having a longitudinal axis substantially coincident with said conveyor longitudinal axis.

* * * * *